May 7, 1968 W. F. LAWLESS 3,382,379

PHASE SHIFTER

Filed March 30, 1964

WILLIAM F. LAWLESS
INVENTOR.

BY James H. Griffin
ATTORNEY

United States Patent Office 3,382,379
Patented May 7, 1968

3,382,379

PHASE SHIFTER

William F. Lawless, Cupertino, Calif., assignor to Ampex Corporation, Redwood City, Calif., a corporation of California Filed Mar. 30, 1964, Ser. No. 355,802
16 Claims. (Cl. 307—262)

This invention relates in general to circuits inducing time delay in an input signal in response to an error signal (or "phase signal shifting") and more particularly to a phase shifter employing a narrow junction degenerate semiconductor diode or "tunnel" diode for extremely accurate, stable, and reliable time delay control.

Applicant's new phase shifter will be described in connection with the head drum servo system of a rotary head type magnetic tape recorder, but it is to be understood that the invention may be applied to any circuit wherein precise time delay control is required over a wide range of frequencies. Previous methods could normally vary phase less than 180 electrical degrees of a period and usually were confined to smaller variations to stay within a tolerable linear region of operation. Heretofore, phase shifter circuits have been considerably more complicated and less precise than that herein described.

The head drum servo system of a magnetic tape recorder utilizes a precision synchronous motor powered by a time stable alternating current (hereinafter denoted "AC") power supply. Feedback to the motor originates from a pick-off head: a magneto-generator having a rotating permanent magnet on the head drum being driven and a field coil fixed to the frame of the tape recorder. The pick-off head produces an AC output signal with a frequency proportional to the speed of rotation of the head drum. This AC output signal, after passing through amplifying and shaping circuitry, is applied to a phase comparator which compares it with an external time base frequency standard to produce an error signal. Following amplification and processing by circuitry designed to compensate for various nonlinearities in the servo loop, this error signal is applied both to a variable frequency oscillator (hereinafter referred to as the VFO) and to a phase shifter.

The VFO, usually of the sawtooth relaxation generator type, has a standard, or nominal, frequency. As the head drum servo motor speed exceeds or falls behind the standard frequency, the error signal from the phase comparator retards or advances the VFO frequency. The output of the VFO passes through the phase shifter where the error signal (in amplified form) effects additional corrections not conveniently achievable by varying the VFO operating frequency, by producing a nominal phase delay (normally a half period of the nominal VFO period, thereby permitting maximum phase variation range). The output from the phase shifter is applied to a motor drive amplifier which ultimately supplies the driving power to the head drum servo motor.

Heretofore, one major difficulty encountered in VFO-phase shifter combined circuits has been undesirable interaction between the VFO and the phase shifter. Often VFO deviation caused phase delay error in the phase shifter, due to the variation in slope of the sawtooth ramp; and in some cases bilateral interaction occurred, mainly because of the input impedance of the phase shifter. The time base accuracy of the phase shifter of a magnetic tape recorder has become of critical importance; for the accuracy of the entire servo loop is determined by it, and likewise, the time base accuracy of playback of recorded signals. To the extent that the servo loop produces time base error, correction must be made by delay lines, which increase in complexity and costliness as the range of error widens.

Up to the present time, the best phase shifter circuit obtainable for the head drum servo system has been one designed around a unijunction transistor which fires when the level of a sawtooth wave at its emitter reaches a predetermined voltage. Such a circuit has to be operated on a straight section of the unijunction characteristic curve in order to ensure linear output and, moreover, requires a complex array of circuit components, including several amplifier inverters and a bistable multivibrator. In spite of its complexity and expense, a unijunction phase shifter is not a satisfactory performer—it has poor temperature stability and is not as reliable as could be desired, mainly because the unijunction does not fire at the same point every time. The unijunction circuit also has a limited useful bandwidth and exhibits the usual drop-off in frequency response found in most circuits containing reactive components.

It is, therefore, a general object of applicant's invention to provide an improved phase shifter circuit.

Another object of this invention is to provide a phase shifter of improved precision, temperature stability, and reliability.

Another object of this invention is to provide a phase shifter that is linear in response through a wider range of frequencies than previous phase shifters.

Another object is to provide a phase shifter circuit which eliminates interaction between VFO and phase shifter even at the very extremes of the deviation range.

In the achievement of the above objects and as a feature of applicant's invention, there is provided a phase shifter wherein a tunnel diode is used for precise time delay control. The tunnel diode being a low current device, problems of power demand and heat generation are virtually eliminated.

It is another feature of applicant's invention that the tunnel diode is driven by a very linear sawtooth generator circuit through a series common base transistor configuration which exercises accurate control of the tunnel diode firing time by controlling the effective series resistance between the tunnel diode and the sawtooth generator. Thus, applicant's phase shifter circuit avoids the need of reactive elements and thereby eliminates upper frequency limitation.

It is another feature of applicant's invention that the input circuit of the phase shifter through which sawtooth waveforms are applied includes a P-N-P–N-P-N common collector transistor setup which serves both as a constant current supply to the timing capacitor which generates a linear ramp voltage and as a low impedance driver for the phase shifter, thereby providing an extremely wide range of phase control.

Other objects and features of this invention and a fuller understanding thereof may be had by referring to the following description and claims, taken in conjunction with the accompanying drawings, in which:

Figure 1:
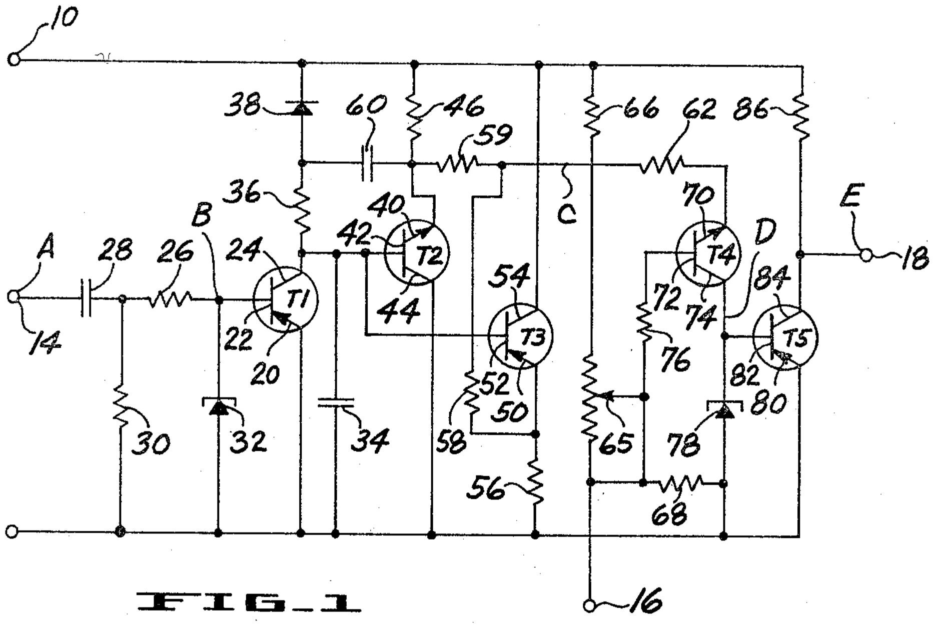
FIGURE 1 is a schematic diagram of a preferred embodiment of applicant's invention.

Referring to FIGURE 1, a preferred embodiment of applicant's new phase shifter has power supply terminals 10 and 12; for purposes of illustration, the terminal 10 is shown as −10 volts and the terminal 12 as +10 volts. Other terminals in applicants circuit are a variable frequency oscillator (VFO) input 14, a phase control input 16, and an output 18.

A transistor T1, having emitter 20, base 22, and collector 24, has its base 22 coupled through a resistor 26 and a coupling capacitor 28 to the VFO input terminal 14. A resistor 30 runs from the power supply 12 to a point between the capacitor 28 and the resistor 26, and a tunnel diode 32 is coupled between the base 22 and the power supply 12. The emitter 20 of the transistor T1 is directly coupled to the power supply 12. The collector 24 of the transistor T1 is coupled to the power supply 12 through a charging capacitor 34 and to the power supply 10 through a resistor 36 and a diode 38. The resistor 36 and the capacitor 34 make up the R-C time constant circuit of a sawtooth generator, the transistor T1 being the sawtooth switch.

The output of the sawtooth circuit appearing at the collector 24 is transmitted to the control elements of a complementary emitter-follower, transistors T2 and T3, having emitters 40, 50, bases (the control elements) 42, 52, and collectors 44, 54, respectively. The transistor T2 is an N-P-N type transistor, while the transistor T3 is a P-N-P type. Accordingly, the collector 44 is directly coupled to the positive power supply 12, and the collector 54 is directly coupled to the negative power supply 10. The emitters 40, 50 are the output electrodes of their respective transistors and are directly coupled to their load resistors, 46, 56, respectively. The emitter 40 is directly coupled to a capacitor 60 which has its other lead joined to the negative end of the sawtooth generator R-C circuit, made up by the capacitor 34 and the resistor 36.

The emitters 40, 50 of the transistors T2, T3 are coupled through resistors 58, 59, respectively, to a resistor 62 in the phase shifting portion of the schematic in FIGURE 1. The phase control input at the terminal 16 is also applied to applicant's circuit, at a delay biasing control made up of a variable resistor 64 having a wiper 65, a resistor 66 between the variable resistor 64 and the power supply 10 and a resistor 68 between the variable resistor 64 and the positive power supply 12 .

The phase shifter inputs through the resistor 62 and the variable resistor 64 are applied to a transistor T4, having emitter 70, base 72, and collector 74, its emitter 70 being coupled through the resistor 62 to the emitters 40, 50 and its base 72 being coupled through a resistor 76 to the phase control input terminal 16 and to the wiper 65 of the variable resistor 64. The collector 74 of the transistor T4 is directly coupled through a tunnel diode 78 to the power supply 12.

A transistor T5 having emitter 80, base 82, and collector 84, has its emitter 80 directly coupled to the power supply 12. The base 82 of the transistor T5 is directly coupled to the collector 74 of the transistor T4. The collector 84 of the transistor T2 is directly coupled to the output terminal 18 and is coupled through a resistor 86 to the power supply 10.

Figure 2:
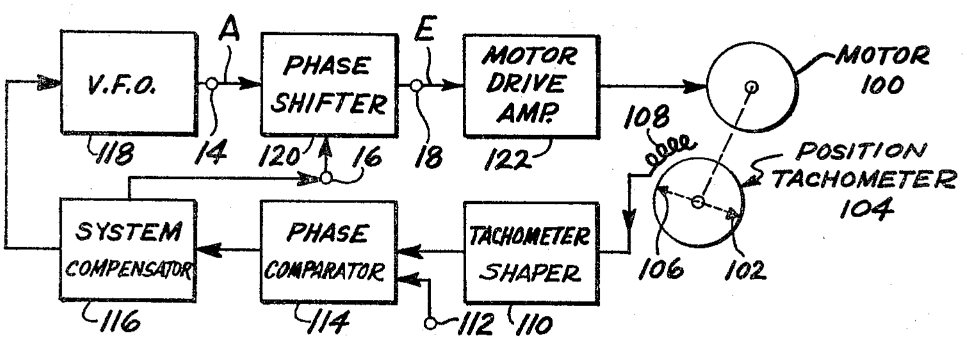
FIGURE 2 is a block diagram of a servo loop wherein applicant's invention may be used.

FIGURE 2 shows a block diagram of a servo loop wherein applicant's circuit is used in place of the conventional variable frequency oscillators and phase shifters which, as stated above, were not wholly satisfactory. The purpose of the circuit is to drive a motor 100, the actuator of a magnetic tape recorder head drum 102. Usually, the rotation of the motor 100 is sensed by a tachometer 104, a generator consisting of a rotating permanent magnet 106 and a fixed field coil 108. The frequency of the signal appearing across the coil 108 is, of course, a function of the angular velocity of the motor shaft. This signal, after passing through a shaper 110, is compared with a time base or frequency standard signal 112 in a phase comparator 114, which produces an error signal. After passing through circuitry at 116 designed to compensate for various nonlinearities in the servo loop, the error signal is applied both to a variable frequency oscillator 118 and to a phase shifter 120, the latter being the subject of applicant's invention. Essentially, the variable frequency oscillator 118 effects gross or long term correction of the angular velocity and phase of the motor, while the phase shifter operates on the output of the variable frequency oscillator to make fine adjustments in motor instantaneous angular velocity and phase. The output of the phase shifter, after being suitably amplified at 122, is applied to drive the motor 100.

Figure 3:
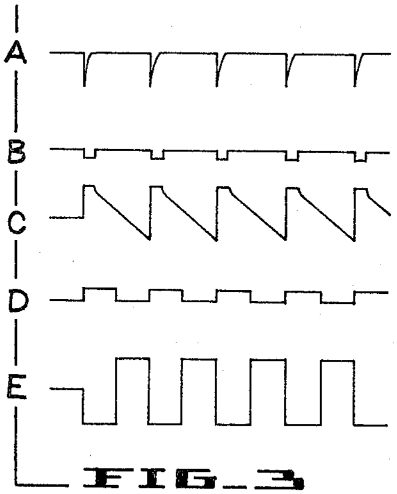
FIGURE 3 sets forth the waveforms at selected points in the circuit shown in FIGURE 1.

In the operation of the circuit illustrated in FIGURE 1 and described above, the pulse shown at (A) in FIGURE 3 is applied to the phase shifter input terminal 14 from the VFO (118, FIGURE 2). Prior to the application of the pulse (A), the tunnel diode 32 is nonconductive and the transistor T1 is cut-off. Thus, the voltage at the collector 24 is substantially that of the power supply 10, —10 v., the voltage at the junction between the resistor 36 and the capacitor 60 is —10 v., the transistor T2 is cut-off, the transistor T3 is saturated, and the voltage at point C is —10 v.

The pulse (A) switches on the tunnel diode 32, which then impresses the pulse (B) upon the base 22 of the transistor T1. The purpose of the tunnel diode 32 is to convert the relatively gradual decline of the leading edge of the pulse (A) into a sharp, instantaneous drop at the base 22, thus providing sudden switching of the transistor T1. The width of the pulse B is also advantageous in ensuring that the capacitor 34 will charge up to full value, regardless of the impedance of the transistor T1, which shifts with temperature.

The effect of the pulse (B) at base 22 is to saturate the transistor T1, thus causing the voltage at the collector 24 to become very near +10 v. The voltage impressed upon the capacitor 34 then becomes very near zero. As soon as the tunnel diode 32 switches off again, the transistor T1 returns to the cut-off state, and the capacitor 34 begins to charge to reflect the +10 v. to —10 v. potential across it; the charging path runs from the positive power supply 12 through the capacitor 34, the resistor 36, and the diode 38, to the negative power supply 10.

When the transistor T1 saturates, the positive voltage at its collector 24 is applied to the bases 42, 52 of the transistors T2 and T3. The transistor T2 being N-P-N, the positive voltage on its emitter 40, substantially the same as the +10 v. on its collector 44, is applied through the resistor 59 to the point C. Also, the voltage of the emitter 40 causes a voltage drop of almost 20 volts to be impressed across the capacitor 60. On the other hand, the saturation of the transistor T1 cuts off the transistor T3; for it is of the P-N-P conductivity type and needs a drop in potential between its emitter 50 and its base 52 in order to conduct.

When the transistor T1 returns to the cut-off state, the capacitor 60 begins to discharge and the capacitor 34 to charge. The voltage at the collector 24 slants down toward the value of the negative power supply 10, to which the collector is coupled; the transistor T2 is driven toward cutoff, while the base 52 of the transistor T3 goes below the voltage of the emitter 50, rendering the transistor T3 more conductive. The transistor T3 will remain conductive until the transistor T1 is switched on again. The result of the combined action of the transistors T2 and T3 in response to the VFO output from the switch T1 and charging capacitor 34 is the waveform (C), the input to the phase shifter proper of applicant's preferred embodiment shown in FIGURE 1.

While the waveform (C) is applied to the emitter 70 of the transistor T4, the phase control input, is applied to the base 72 of the transistor T4. Thus, the transistor T4 has for the output at its collector 74 the waveform (C) somewhat raised or lowered in level. The change of level, of course, changes the point along the sawtooth ramp where the tunnel diode 78 will switch from its conductive state to its nonconductive state, since it switches (producing waveform 3 (D)) at a certain reference voltage determined by its operating characteristics and bias. Thus, the phase control input shifts the phase of the output of applicant's phase shifter by raising or lowering the current level of the sawtooth through transistor T4, causing the tunnel diode 78 to switch earlier or later, depending on whether the sawtooth ramp passes the switching reference level.

When the tunnel diode 78 is in its off state, the transistor T5 has almost the same voltage at its base 82 as at its emitter 80; accordingly, it does not conduct, and the voltage at the collector 84 and the output terminal 18 is that of the power supply 10, −10 volts. When the tunnel diode switches on, the voltage at the collector 74 of transistor T4 (point D) drops far enough to drive the transistor T5 to saturation. Then, of course, the voltage at the collector 84 and output terminal 18 is that of the power supply 12, +10 volts. The overall effect at the output terminal 18 of the waveform (D) applied to the base 82 of the transistor T5 is shown at FIGURE 3E: pulses of width and position determined both by the VFO input at 14 and the phase control input at 16.

A phase shifter in accordance with the above description and drawing was built and operated using the following components:

| | |
|---|---|
| Voltages: | |
| **10** ---------- v. DC | 10 |
| **12** ---------- v. DC | +10 |
| Transistors: | |
| T1 | 2N1309 |
| T2 | 2N1308 |
| T3 | 2N1309 |
| T4 | 2N839 |
| T5 | 2N1309 |
| Diodes: | |
| **32** | 1N2929 |
| **38** | 1N281 |
| **78** | 1N2929 |
| Resistors (ohms): | |
| **26** | 820 |
| **30** | 2K |
| **36** | 27K |
| **46** | 1.5K |
| **56** | 1.5K |
| **58** | 27 |
| **59** | 27 |
| **62** | 390 |
| **64** | 5K |
| **66** | 10K |
| **68** | 2K |
| **86** | 2.7K |
| Capacitors (microfarads): | |
| **28** | .02 |
| **34** | .068 |
| **60** | 2.2 |

The circuit composed of the above specified components exhibited no upper control frequency limitation; in fact, the control frequency can exceed even the operational frequency of the phase shifter itself. The P-N-P–N-P-N amplifier enabled the phase shifter circuit to achieve a phase control range of 94%. The sawtooth input to the phase shifter had a peak of 15 v. and a period of 1250 microseconds; sensitivity was 100 microseconds per volt error signal. Time base error was 0.2 microsecond, whereas that of prior phase shifters was 5.0 microseconds. No significant interaction was experienced between the VFO and the phase shifter, even at the extremes of the deviation range.

Thus, applicant has provided not only an improved phase shifter circuit but also a VFO-phase shifter connecting network for precision servo loops having accuracy, temperature stability, and reliability characteristics vastly superior to prior circuits of this type and a much wider range of frequency response. Moreover, the number, complexity, and expensiveness of the components of the phase shifter unit have been minimized, and significant economy has been achieved in regard to power supply requirements.

A number of alternative arrangements will readily suggest themselves to those skilled in the art. For example, N-P-N conductivity type transistors and P-N-P conductivity type transistors may be interchanged, if only the power supply, biasing elements, and other circuit components are appropriately reversed. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. A phase shifter for producing an output pulse in response to a varying amplitude waveform and a phase change signal, comprising: means for varying the level of the varying amplitude waveform in response to the phase change signal, and means for switching alternately between one voltage and another in response to the crossing of a certain reference level by the level-varied varying amplitude waveform thereby simultaneously providing isolation between said signal and said waveform while in one of said voltage levels.

2. A phase shifter for producing an output pulse in response to a waveform and a phase change signal, comprising: means for varying the level of the waveform in response to the phase change signal, and a tunnel diode biased to switch alternately between conductive and nonconductive states in response to the crossing of a certain reference level by the level-varied waveform thereby simultaneously providing isolation between said signal and said waveform while in one of said states.

3. A phase shifter for producing an output pulse in response to a waveform and a phase change signal, comprising: means for varying the level of the waveform in response to the phase change signal, a tunnel diode biased to switch alternately between conductive and nonconductive states in response to the crossing of a certain reference level by the level-varied waveform thereby simultaneously providing isolation between said signal and said waveform while in one of said states, and an active switching element having control electrode and output electrode, the control electrode being coupled to the tunnel diode.

4. A phase shifter for producing an output pulse in response to an input waveform and a phase change signal, comprising: an active circuit element having input electrode, control electrode, and output electrode, the input electrode being coupled to receive the input waveform and the control electrode being coupled to receive the phase change signal, said active element thereby generating at the output electrode thereof said input waveform varying in level in accordance with the phase change signal, and a tunnel diode coupled to said output electrode and biased to switch alternately between conductive and nonconductive states in response to the crossing of a certain reference level by the level-varied input waveform thereby simultaneously providing isolation between said signal and said waveform while in one of said states.

5. A phase shifter for producing an output pulse in response to an input waveform and a phase change signal comprising: an input circuit including two transistors of opposite conductivity type and arranged in the emitter-follower configuration, an active circuit element having input electrode, control electrode, and output electrode, the input electrode being coupled to the emitters of the input circuit transistors and the control electrode being coupled to receive the phase change signal, said active circuit element thereby generating at the output electrode thereof said input waveform varying in level in accordance with said phase change signal, and a tunnel diode coupled to the output electrode of the active circuit element and biased to switch alternately between conductive and nonconductive states in response to the crossing of a certain reference level by the level-varied input waveform.

6. In a phase shifter circuit having a sawtooth waveform source, a phase control input terminal, a first voltage source, a second voltage source, and an output terminal, the combination comprising: a first transistor having emitter, base, and collector, the emitter of the first transistor being coupled to the sawtooth waveform source, the base of the first transistor being coupled through a resistor to the phase control input terminal and the collector of the first transistor being coupled through a tunnel diode to the first voltage source, a variable resistor connected between the first voltage source and the second voltage source with its wiper coupled through a resistor to the base of the first transistor, and a second transistor having emitter, base, and collector, the emitter of the second transistor being directly coupled to the first voltage source, the base of the second transistor being directly coupled to the tunnel diode, and the collector of the second transistor being directly coupled to the output terminal and through a resistor to the second voltage source.

7. In a phase shifter circuit having a sawtooth waveform source, a phase control input terminal, a first voltage source, a second voltage source, and an output terminal, the combination comprising: a first transistor having emitter, base, and collector, the emitter of the first transistor being coupled to the sawtooth waveform source, the base of the first transistor being coupled to the phase control input terminal, and the collector of the first transistor being coupled through a tunnel diode to the first voltage source, a second transistor having emitter, base, and colloctor, the emitter of the second transistor being directly coupled to the first voltage source, the base of the second transistor being directly coupled to the tunnel diode, and the collector of the second transistor being directly coupled to the output terminal and through a resistor to the second voltage source.

8. In a phase shifter circuit having a waveform source, a phase control input terminal, and an output terminal, the combination comprising: a first active circuit element having input, control, and output electrodes, the input electrode being coupled to the waveform source, the control electrode being coupled to the phase control input terminal, and the output electrode being coupled to a tunnel diode for deriving an output waveform whose level is varied in accordance with a phase change signal at said control electrode.

9. In a phase shifter circuit having a waveform source, a phase control input terminal, and an output terminal, the combination comprising: a first active circuit element having input, control, and output electrodes, the input electrode being coupled to the waveform source, the control electrode being coupled to the phase control input terminal, and the output electrode being coupled to a tunnel diode, and an active switching element having control and output electrodes, the control electrode being coupled to the junction of tunnel diode and said output electrode of said first active circuit element and the output electrode being coupled to the output terminal for deriving an output waveform whose level is varied in accordance with a phase control signal at said control electrode of said first active circuit element.

10. In a control circuit having a first control signal terminal, a second control signal terminal, a first voltage source, a second votlage source, and an output terminal, the combination comprising: a first transistor having emitter, base, and collector, the base of the first transistor being coupled ot the first control signal terminal, a tunnel diode coupled between the emitter of the first transistor and the base of the first transistor, a charging capacitor coupled between the emitter of the first transistor and the collector of the first transistor, second and third transistors of opposite conductivity type and in emitter-follower configruation, each having emitter, base, and collector, their bases being coupled to the collector of the first transistor, a fourth transistor having emitter, base, and collector, the emitter of the fourth transistor being coupled to the emitters of the second and third transistors, the base of the fourth transistor being coupled through a variable resistor to the phase control input terminal, and the collector of the fourth transistor being coupled through a tunnel diode to the first voltage source, and a fifth transistor having emitter, base, and collector, the emitter of the fifth transistor being directly coupled to the first power supply, the base of the fifth transistor being directly coupled to the tunnel diode, and the collector of the fifth transistor being coupled directly to the output terminal and through a resistor to the second power supply.

11. In a circuit for generating sawtooth waveforms having an input terminal, power supply, and an output terminal the combination comprising: a first transistor having emitter, base, and collector, the base of the first transistor being coupled to the input terminal, a tunnel diode coupled between the emitter of the first transistor and the base of the first transistor, a first charging capacitor coupled between the emitter of the first transistor and the collector of the first transistor, second and third transistors of opposite conductivity type and in emitter-follower configuration, each having emitter, base, and collector, their bases being coupled to the collector of the first transistor, a first resistor coupled to the collector of the first transistor, a blocking diode coupled between the resistor and the power supply, and a second charging capacitor and a second resistor in series with each other and in parallel with the blocking diode.

12. In a circuit for generating sawtooth waveforms having an input terminal, power supply, and an output terminal, the combination comprising: a transistor having emitter, base, and collector, the base of the transistor being couplied to the input terminal, a tunnel diode coupled between the emitter of the transistor and the base of the transistor, a first charging capacitor coupled between the emitter of the transistor and the collector of the transistor, a first resistor coupled to the collector of the transistor, a blocking diode coupled between the first resistor and the power supply, and a second charging capacitor and a second resistor in series with each other and in parallel with the blocking diode.

13. In a circuit for generating sawtooth waveforms having an input terminal and a power supply, the combination comprising: switching means coupled to the input terminal, a first charging capacitor in parallel with the switching means, a first resistor and a unidirectional conductive device in series between the charging capacitor and the power supply, and a second charging capacitor and a second resistor in series with each other and in parallel with the unidirectional conductive device.

14. A phase shifter according to claim 1, further defined by means for varying the frequency of said waveform.

15. A phase shifter according to claim 3, further defined by means for varying the frequency of said waveform.

16. The combination of claim 7, further defined by said sawtooth waveform source having a variable frequency.

References Cited

UNITED STATES PATENTS

| | | | |
|---|---|---|---|
| 2,880,332 | 3/1959 | Wanlass | 307—88.5 |
| 3,149,293 | 9/1964 | Farkas | 307—88.5 |
| 3,201,611 | 8/1965 | Mollinga | 307—88.5 |

JOHN S. HEYMAN, *Primary Examiner.*